United States Patent [19]

Shirahata

[11] Patent Number: 5,207,969
[45] Date of Patent: May 4, 1993

[54] PROCESS OF PRODUCING BLOW MOLDED ARTICLE

[75] Inventor: Itaru Shirahata, Ohbu, Japan

[73] Assignee: Tokai Kogyo Co., Ltd., Ohbu, Japan

[21] Appl. No.: 747,810

[22] Filed: Aug. 20, 1991

[30] Foreign Application Priority Data

Oct. 12, 1990 [JP] Japan .................................. 2-272477

[51] Int. Cl.⁵ .................................. B29C 49/20
[52] U.S. Cl. .................................. 264/516; 425/503; 425/504; 425/812
[58] Field of Search ............... 264/510, 516, 513, 515, 264/509; 425/503, 504, 812; 156/286

[56] References Cited

U.S. PATENT DOCUMENTS

| | | | |
|---|---|---|---|
| 3,072,969 | 1/1963 | DuBois | 264/509 |
| 3,267,186 | 8/1966 | Battenfeld | 264/509 |
| 3,287,198 | 11/1966 | Battenfeld | 264/509 |
| 4,177,061 | 9/1978 | Jorgenso | 425/503 |

FOREIGN PATENT DOCUMENTS

| | | | |
|---|---|---|---|
| 75414 | 9/1932 | Fed. Rep. of Germany | 425/812 |
| 63-252718 | 10/1988 | Japan | 425/503 |
| 1024722 | 1/1989 | Japan | 425/503 |
| 1195017 | 8/1989 | Japan | 425/503 |
| 1196324 | 8/1989 | Japan | 425/503 |

Primary Examiner—Jan H. Silbaugh
Assistant Examiner—Catherine Timm
Attorney, Agent, or Firm—Flynn, Thiel, Boutell & Tanis

[57] ABSTRACT

A process for producing a blow molded article, in which a parison is disposed between an outer face-forming mold section having an air bleeding hole and a bottom face-forming mold section and adjacent said bottom face-forming mold section. A resin film is disposed between the parison and the outer face-forming mold section. Then the outer face-forming mold section and bottom face-forming mold section are closed. Then air is blown into the parison to inflate the parison to form the end product and simultaneously to mold the resin film and the end product in an integral relationship with each other.

3 Claims, 3 Drawing Sheets

PROCESS OF PRODUCING BLOW MOLDED ARTICLE

BACKGROUND OF THE INVENTION

1. Field of the Invention

This invention relates to a process for producing, by a blow molding method, a molded article which can be attached to an outside panel of the body of a vehicle for the purpose of cushioning, prevention of damage or decoration of the vehicle body.

2. Description of the Prior Art

Moldings (molded articles) made of moldable plastics can be obtained by various processes, including extrusion molding, injection molding, blow molding and the like. In recent years, the demand has increased for molded articles which have a beautiful appearance and which match the color of a vehicle body and for molded articles to which characters, a decorative design or the like, have been applied for improving the appearance of the molded articles.

In order to color a molded article, generally, painting is performed separately after molding in most applications of the aforementioned molding methods.

In the case of blow molding, a stripe or projecting ridge is likely to be formed on the molding, caused by an irregular flow of the resin during extrusion of the preform or parison, or by damage to the mold or the like. Also, the transfer pressure to the molding face of a metal mold section is relatively low compared to the pressure during extrusion molding. Consequently, the ridge formed during extrusion molding remains on the surface of the molded article, and accordingly, it is difficult to obtain a flat and smooth surface of the molded article.

In order to remove the air that is present between the parison and the molding face of a metal mold section, an air-bleeding hole is sometimes formed on the molding face of the metal mold section. However, there is a disadvantage that, during blow molding, the adjacent portion of the parison will flow into such an air-bleeding hole and a small projection will be formed on the outer face of the molded product.

Accordingly, surface finish processing is required for such a molded article, as described above, in order to remove the stripe or small projection. When it is desired to color the molded article, also a painting step is required. Therefore, in order to obtain a desired appearance, surface finish processing and painting steps are essential. This is disadvantageous because the number of man-hours required for production of the molded article is increased, the cost of the product is increased, and so forth.

Thus, for the purpose of improving the appearance of the molded article, a method of molding a resin film integrally with the parison, instead of painting, has been invented. However, if a molded article is produced by such a method as described above, the air present between the molding face of a metal mold section and the resin film and the air present between such resin film and the parison cannot be removed and another problem occurs, namely, that the appearance of the molded article is deteriorated. Such phenomenon is likely to take place even when the outer surface of the molded article is very rough in shape. There is a tendency that such a phenomenon will take place, particularly around a convex portion of the molded article.

It has also been found out that, as the height dimension of the molded article increases, that is, as the dimension from the mounting face to the top portion of an outer surface becomes larger, the formation of a satisfactory coating of a resin film becomes more difficult, and whitening or breaking, by elongation of the resin film, takes place.

Accordingly, it is an object of the present invention to provide a process of producing a molded article having a good appearance by using a resin film in a blow molding method.

It is another object of the present invention to provide a process which can remove the air which remains when a resin film is placed on the parison.

It is a further object of the present invention to provide a process of preventing whitening and breaking of the resin film.

SUMMARY OF THE INVENTION

The present invention has solved the problems described above firstly by a process wherein a parison is disposed between an outer face-forming mold section having an air-bleeding hole and a bottom face-forming mold section and adjacent the bottom face-forming mold section, a resin film is disposed between the parison and the outer face-forming mold section, then the outer face-forming mold section and the bottom face-forming mold section are closed, and then air is blown into the parison to inflate the parison to its final shape and simultaneously to mold the resin film and the parison in an integral relationship with each other.

The resin film is interposed between the parison and the outer face-forming mold section, the air-bleeding hole being perforated in said mold section. While the parison is in a molten condition upon mold closing, because the resin film is interposed between the parison and the outer face-forming mold section, the parison will not flow into the air-bleeding hole. Accordingly, the final surface of the molded article will be flat.

A second feature of the present invention is that the resin film is placed between the parison and the outer face-forming mold section while applying tension to the resin film, and the resin film is held under tension in such a manner that the tension is gradually decreased as mold closing proceeds so as to prevent whitening or breaking of the resin film.

A third feature of the present invention is that the resin film has a plurality of through-holes so as to remove the air that remains between the parison body and the outer face-forming mold section.

DESCRIPTION OF THE PREFERRED EMBODIMENT

Figure 1:
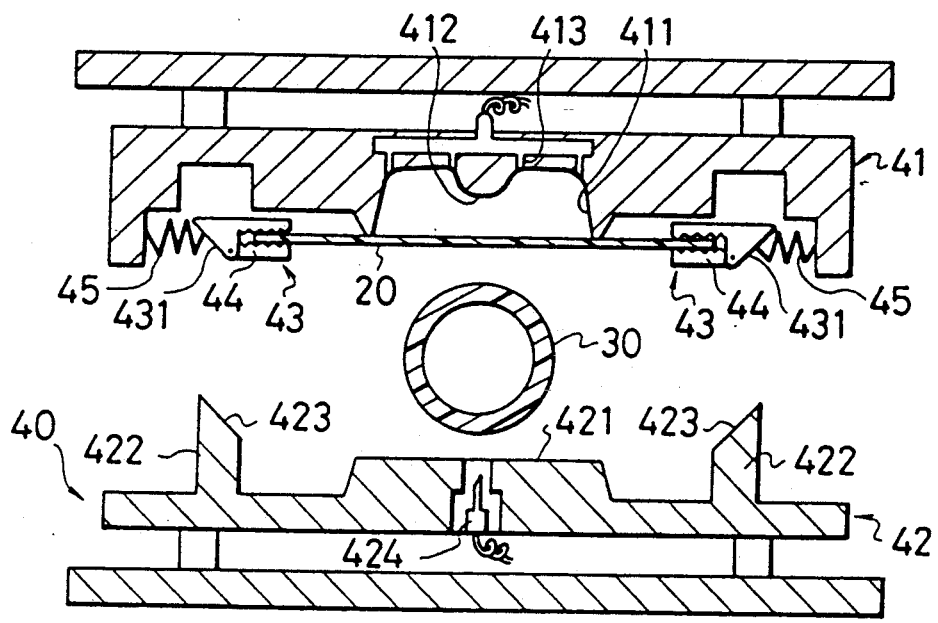
FIG. 1 is a sectional view of a metal mold adapted for practicing the process of the present invention, the mold being shown in a condition before the mold is closed.

FIG. 1 is a sectional view of a metal mold apparatus 40 for practicing the process according to the prevent invention. Reference numeral 20 denotes a resin film, and 30 denotes a tubular preformed moldable plastic body (parison). The resin film 20 and the parison 30 are integrally molded and a molded article 10 is produced in the metal mold apparatus 40.

Figure 4:
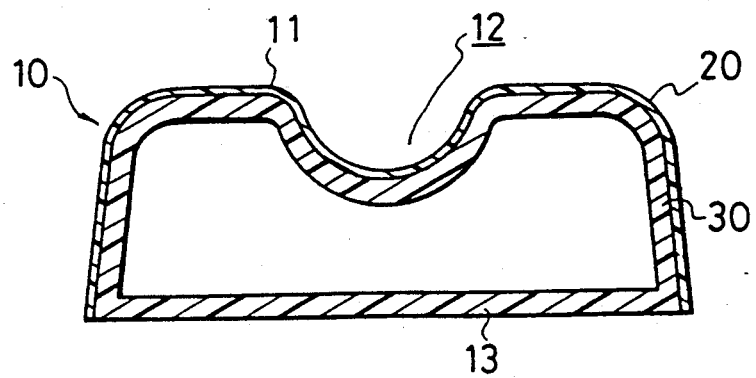
FIG. 4 is a sectional view of a molded article produced in accordance with the present invention.

FIG. 4 is a cross-sectional view of a representative molded article 10 for a vehicle produced in accordance with the present invention.

Referring to FIG. 4, the molded article 10 is made of a resin film 20 and a blow molded body 30A.

The resin film 20 is decorated by a suitable method such as painting, vacuum vapor deposition or printing. The resin film 20 is either (1) made, on its rear face side, of the same material as the parison 30 or (2) coated, on its rear face side, with a heat-sensitive bonding agent, so that the film 20 can be bonded to the blow molded body 30A.

Figure 5:
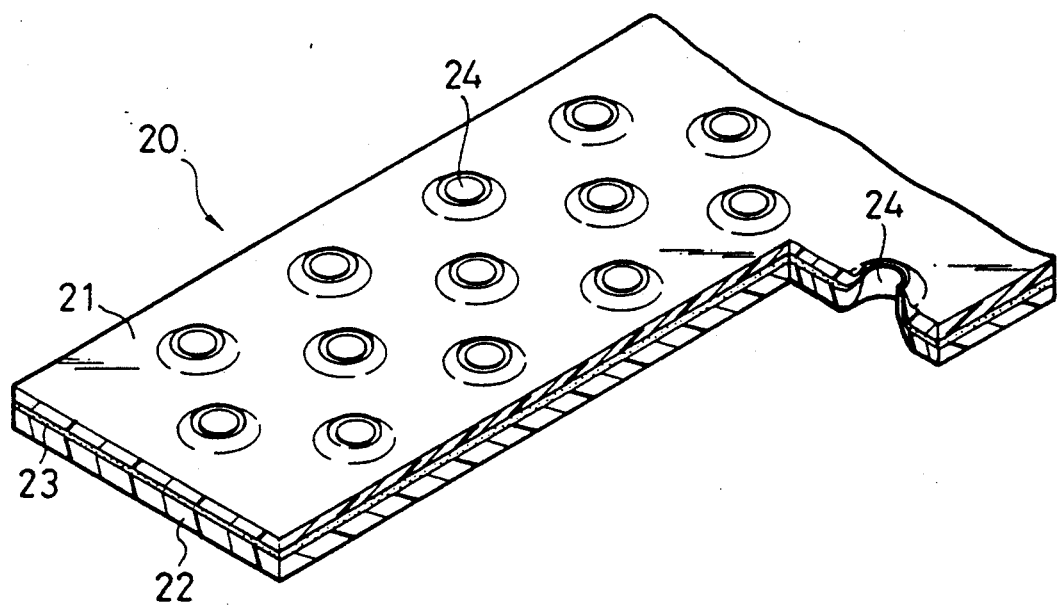
FIG. 5 is a perspective, partially sectional view showing a resin film which is used for producing a molded article in accordance with the present invention.

FIG. 5 is a perspective view showing a partial section of an example of a resin film 20. As shown in FIG. 5, the resin film 20 has a transparent layer 21 on the front face side and a colored layer 22 on the rear face side. The transparent layer 21 and the colored layer 22 are laminated integrally by a bonding agent 23. The transparent layer 21 is made of a suitable material such as polyvinyl fluoride, polyester resins, etc. The colored layer 22 is made of a same material as the parison 30. A plurality of through-holes 24 in the form of projections perforated by a knurling roll or the like are provided in the resin film 20. The through-holes 24 penetrate through all of the layers 21, 22 and 23.

The parison 30 is a hollow body. The parison 30 is made of a material selected from among synthetic moldable resin materials, such as polypropylene, polyethylene and a blend of polyphenylene oxide and polystyrene (trademark: Noryl).

The resin film 20 is integrally coated and molded on the parison 30 so that it can form an outer face of the molded body 10.

As shown in FIG. 4, the molded article 10 of the present embodiment has a continuous or discontinuous recessed portion 12 formed on the outer face 11 and extending in the longitudinal direction of the molded article 10. The bottom portion 13 is a mounting face for mounting the molded body 10 on an outside panel of a vehicle. The bottom portion 13 is substantially flat.

Figure 2:
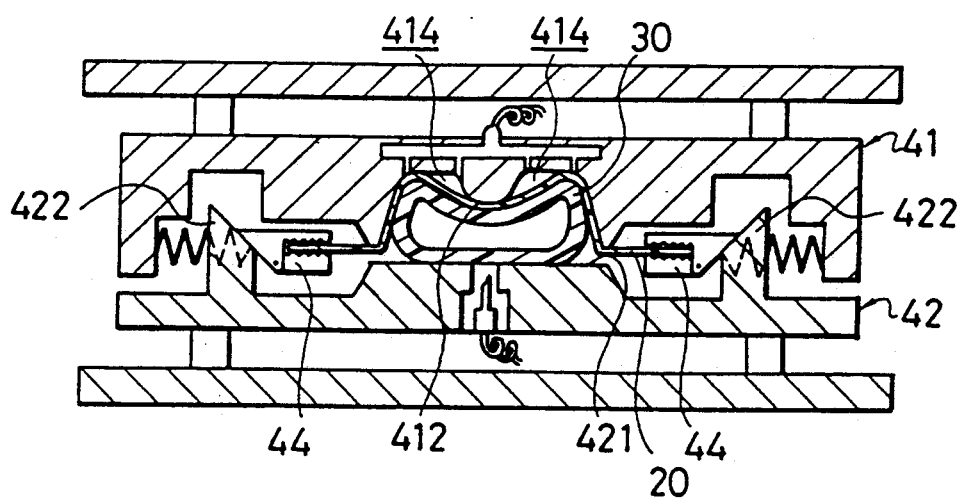
FIG. 2 is a sectional view of the metal mold apparatus of FIG. 1 during mold clamping.
Figure 3:
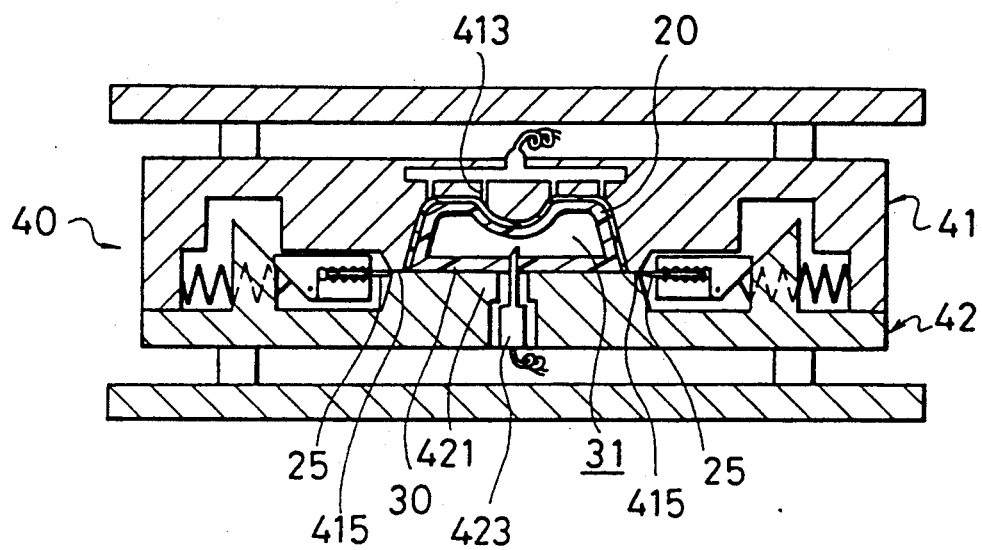
FIG. 3 is a sectional view of the metal mold apparatus of FIG. 1 upon completion of mold closing.

FIGS. 1 to 3 show the metal mold apparatus 40 for producing the molded article 10 shown in FIG. 4. FIG. 1 shows the mold in an open condition before starting molding.

Referring to FIG. 1, the metal mold 40 has an outer face-forming mold section 41 for forming the outer surface 11 of the molded article 10, and a bottom face-forming mold section 42 for forming the bottom face 13 of the molded article 10. A pair of tensioning mechanisms 43 for tensioning the resin film 20 are provided at the parting portion of the outer face-forming mold section 41.

Each of the tensioning mechanisms 43 has a film-holding jig 44 for holding the resin film 20. A tension spring 45 is provided between the holding jig 44 and the outer face-forming mold section 41. The tensioning mechanisms 43 hold the resin film 20 in a tensioned condition in the outer face-forming mold section 41.

Each of the holding jigs 44 has formed thereon an inclined portion 431 which is engagable with and is slidably movable on a camming projection 422 of the bottom face-forming mold section 42 which will be hereinafter described.

A projecting portion 412, corresponding in shape to the shape of the recessed portion 12 of a molded article 10, is provided on an outer face-forming portion 411 of the outer face-forming mold section 41. Air-bleeding holes 413 are formed in the mold section 41 close to the base of the projecting portion 412.

The bottom face-forming mold section 42 has a bottom face-forming portion 421 and a pair of upwardly projecting portions 422. Each of the projecting portions 422 has an inclined face 423 formed thereon, which face can slidably move on the inclined face 431 of the corresponding holding jig 44. Reference numeral 424 denotes an air blowing needle for supplying air to blow the parison into the configuration of the mold cavity when the mold is closed (FIG. 3).

The parison 30 is suspended between the outer face-forming mold section 41 and the bottom face-forming mold section 42 while the length thereof from the die head (not shown) of the parison forming machine is controlled.

FIG. 2 is a sectional view of the metal mold 40 during mold closing. In the same figure, the parison 30 is enclosed between the outer face-forming portion 411 and the bottom face-forming portion 421 by the mold closing operation. The parison 30 is deformed from its initial annular cross-section into a flattened tubular cross-section. The resin film 20 is interposed between the parison 30 and the outer face-forming portion 411. During the molding operation, the tapered faces 431 of the holding jigs 44 are contacted by and slidably move along the tapered faces 423 of the projecting portions 422. The holding jigs 44 are thereby moved toward the central portion of the outer face-forming mold section 41, and, accordingly, the tension of the resin film 20 is decreased. Consequently, the resin film 20 is pressed against the outer surface of the parison 30 and is contacted with part of the projecting portion 412 and outer face-forming portion 411 of the outer face-forming mold section 41.

Air that remains between locations at which the resin film 20 and the parison 30 contact each other is discharged to the outer face-forming mold section 41 from the through-holes 24 provided in the resin film 20.

It is to be noted that in order to assure the proper tensioning of the resin film 20 and remove such defects as wrinkles, the holding jigs 44 are operated preferably after the resin film 20 and the parison 30 have initially contacted each other.

In the proximity of the projecting portion 412 of the outer face-forming mold section 41, enclosed zones 414 are formed which zones are closed by the outer face-forming portion 411 and the resin film 20. Air in the enclosed zones 414 is discharged by way of the air-bleeding holes 413. Discharging of air in the enclosed zones 414 can be speeded-up by means of a vacuum pump (not shown).

FIG. 3 is a sectional view of the metal mold after mold closing has been completed and the parison 30 has been inflated to its final shape. In FIG. 3, the resin film 20 and the parison 30 are in a closely contacted condition with each other because the air that may have been present therebetween has been discharged already from the through-holes 24. The chamber 31 inside of the parison 30 is compressed as a result of the mold closing while the resin film 20 and the parison 30 are closely contacting each other, without leaving a gap between the outer face-forming portion 411 and the bottom face-forming portion 421 by the pressure of air blown into the chamber 31 from the air blowing needle 424.

Air that remains between the resin film 20 and the outer face-forming portion 411 and air discharged from the through-holes 24 to the outer face-forming portion 411 is removed by means of the air-bleeding holes 413.

The through-holes 24 in the form of projections provided on the resin film 20 are pressed against and closed by the outer face-forming portion 411 because heat from the parison 30 will soften and melt the film 20 and the air pressure in the chamber 31 will cause the parison 30 to press against and close the holes 24 so that the outer face of the resin film 20 will become flat and smooth.

The marginal remaining portions 25 of the resin film 20, other than the portions that are adhered to the parison 30, are cut and separated by a cutting nipper mechanism 415 provided on the mating faces of the outer face-forming mold section 41 and bottom face-forming mold section 42.

It is to be noted that although the holding jigs 44, in this embodiment, are constructed and arranged so that they reduce the tension of the resin film 20 in response to the mechanical operation of closing the outer face-forming mold section 41 and the bottom face-forming mold section 42, it is possible to slidably move the holding jigs by some other method. In particular, the mold closing operation can be converted into an electric signal and the holding jigs 44 can be slidably moved by means of air cylinders or the like in response to such electrical signal.

In the process for producing a molded article, according to the present invention, a visually observable surface side of a parison can be covered with a decorative resin film, and a molded article having a good appearance can be obtained by blow molding the thus-covered parison.

Generally, when blow molding is performed only with a parison, the parison flows into each air-bleeding hole and produces a projection on the visible face of the final product. According to the present invention, since the resin film is bonded integrally on the parison, the resin film contacts and covers the air-bleeding hole. Accordingly, no projection is formed on the molded article as a final product, and a molded article having a good appearance can be obtained.

According to another aspect of the process, a suitable tension is applied to the resin film and the tension is gradually decreased in response to mold closing. In this manner, production of wrinkles is prevented before the mold is closed and whitening, breaking and so forth of the resin film are prevented after mold closing. Particularly, if this feature were not provided, as the height dimension of the molded article increased, the degree to which the resin film is extended would increase but, according to the present invention, there is no such drawback and a good quality product can be obtained. Accordingly, it is easy to obtain molded articles with various different cross-sectional shapes.

According to another aspect of the process of the invention, the air remaining between the resin film and the parison can be discharged and a molded article can be obtained in which the adhesion between the resin film and the parison is improved and the molded article has a good appearance.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for producing a blow molded article, comprising:
    placing (1) a parison capable of being blow molded, and (2) a resin film, between a first mold section having a first molding surface for forming the outer face of the blow molded article and a second mold section having a second molding surface for forming the inner face of the blow molded article, said first mold section having air-bleeding hole means through said first surface for removing air therefrom, said first and second mold sections being spaced-apart from each other, said resin film being located between said first molding surface and said parison;
    applying a tension force for maintaining said resin film under tension between said first molding surface and said parison;
    then closing said first and second mold sections to form a mold cavity, gradually reducing said tension force applied to said film in response to closing of said first and second mold sections so that said film can freely conform to the shape of said parison, blowing a pressurized fluid into said parison to inflate the parison to form it into said blow molded article having the shape of the mold cavity and simultaneously to unite said film to the outer face of said blow molded article, and removing air from between said first molding surface and said resin film through said bleeding hole means;
    then cooling the blow molded article, opening said mold sections and removing the blow molded article.

2. A process as claimed in claim 1, in which said resin film has a plurality of through-holes therein and including the step of permitting air present between said film and said parison to escape through said through-holes to said air-bleeding hole means during closing of said first and second mold sections and during inflating of said parison.

3. A process for producing a blow molded article, comprising:
    placing (1) a parison capable of being blow molded, and (2) a resin film, between a first mold section having a first molding surface for forming the outer face of the blow molded article and a second mold section having a second molding surface for forming the inner face of the blow molded article, said resin film having a multiplicity of through-holes therein, said first mold section having air-bleeding hole means through said first surface for removing air therefrom, said first and second mold sections being spaced-apart from each other, said resin film being located between said first molding surface and said parison;
    pulling on opposite edges of said resin film to maintain it under tension when it is placed between the first and second mold sections;

then closing said first and second mold sections to form a mold cavity, gradually reducing to zero the tension applied to said film in response to closing of said first and second mold sections and moving said opposite edges of said film toward each other so that said film can freely conform to the shape of said parison as said first and second mold sections are closed and said parison is inflated, discharging air present between said film and said parison through said through-holes, blowing a pressurized fluid into said parison to inflate the parison to form it into said blow molded article having the shape of the mold cavity and simultaneously to unite said film to the outer face of said blow molded article, and softening and melting said film while inflating said parison to press said parison against said film and thereby close said through-holes;

then cooling the blow molded article, opening said mold sections and removing the blow molded article.

* * * * *